(12) United States Patent
Agrawalla et al.

(10) Patent No.: US 7,379,417 B2
(45) Date of Patent: May 27, 2008

(54) ORTHOGONAL FREQUENCY DIVISION MULTIPLEXING TRANSMITTER SYSTEM AND VLSI IMPLEMENTATION THEREOF

(75) Inventors: Shyam Ratan Agrawalla, Bangalore (IN); Aseem Pandey, Bangalore (IN); Shrikant Manivannan, Bangalore (IN)

(73) Assignee: Wipro Limited, Bangalore, Karnataka (IN)

( * ) Notice: Subject to any disclaimer, the term of this patent is extended or adjusted under 35 U.S.C. 154(b) by 938 days.

(21) Appl. No.: 10/371,390

(22) Filed: Feb. 19, 2003

(65) Prior Publication Data

US 2004/0160892 A1  Aug. 19, 2004

(51) Int. Cl.
*H04J 11/00* (2006.01)
(52) U.S. Cl. .................................. 370/208; 370/210
(58) Field of Classification Search ............. None
See application file for complete search history.

(56) References Cited

U.S. PATENT DOCUMENTS

| | | | |
|---|---|---|---|
| 6,754,170 B1 * | 6/2004 | Ward ........................... 370/208 |
| 6,898,198 B1 * | 5/2005 | Ryan et al. .................. 370/338 |
| 6,920,184 B1 * | 7/2005 | Schouhamer Immink ... 375/295 |
| 7,031,249 B2 * | 4/2006 | Kowalski ...................... 370/203 |
| 2003/0072395 A1 * | 4/2003 | Jia et al. ...................... 375/341 |
| 2003/0134473 A1 * | 7/2003 | Sung et al. .................. 438/257 |
| 2003/0169824 A1 * | 9/2003 | Chayat ........................ 375/260 |
| 2004/0151109 A1 * | 8/2004 | Batra et al. .................. 370/208 |
| 2005/0233710 A1 * | 10/2005 | Lakkis et al. ............... 455/102 |
| 2006/0250936 A1 * | 11/2006 | Chen et al. .................. 370/208 |

* cited by examiner

*Primary Examiner*—Andrew C. Lee
(74) *Attorney, Agent, or Firm*—Global IP Services, PLLC; Prakash Nama (57) ABSTRACT

A system for transmitting data in wireless communication employing an improved orthogonal frequency division multiplexing (OFDM) transmitter is devised. The orthogonal frequency division multiplexing (OFDM) transmitter is improved for VLSI implementation. The improved orthogonal frequency division multiplexing transmitter is configured to provide multi-rate support, low latency, reduction in the turnaround time and reduction in the gate count during data transmission.

29 Claims, 10 Drawing Sheets

ORTHOGONAL FREQUENCY DIVISION MULTIPLEXING TRANSMITTER SYSTEM AND VLSI IMPLEMENTATION THEREOF

FIELD OF THE INVENTION

The present invention in general relates to radio communication systems. More particularly, the present invention relates to an improved orthogonal frequency division multiplexing transmitter system and VLSI implementation thereof.

BACKGROUND OF THE INVENTION

The use of a multi-carrier modulation scheme that encodes data onto a radio frequency is known. Orthogonal Frequency Division Multiplexing (OFDM) transmitter, a form of multi-carrier modulation scheme is also known. The use of OFDM to enhance efficient use of the bandwidth as well as to achieve robust communications during multipath interferences is also known.

Prior art OFDM Transmitter chains comprise a variety of components, interfacing to perform the designated functions. The major components in an OFDM Transmitter chain include a Media Access Control (MAC) Interface, a Scrambler, an Encoder, a Puncturer, an Interleaver, an IFFT and a Wave Shaper Block.

In an OFDM transmitter, a Media Access Control (MAC) Interface is configured to convert data to the desired system clock of the OFDM Transmitter. A Scrambler is employed to scramble the serial data coming from MAC. An Encoder enables encoding of the scrambled data bits to generate coded bits. A Puncturer is configured to puncture the encoded bits to meet the data rate constraint.

In an OFDM Transmitter, an Interleaver enables shuffling of data bits to reduce burst error. After shuffling of data bits, a group of data bits are formed. Number of bits in the group depends on the type of modulation. For Binary Phase Shift Keying (BPSK) there is only one bit in the group whereas for 64-Quadrature Amplitude Modulation (64-QAM) 6 bits form a group. This group of data bits map to a particular constellation point depending on modulation type. To normalize the power during transmission, after mapping to a particular constellation point power normalization is done for all the data sub-carriers. This normalization factor depends on the type of modulation.

After mapping to a constellation point, pilots and nulls are inserted at particular position before converting it into time domain OFDM symbol. An IFFT Block converts the frequency domain OFDM symbol to a composite time domain OFDM symbol. Further, to reduce the effect of Inter Symbol Interference (ISI), a Guard Interval is inserted in the IFFT output to form a complete time domain OFDM symbol. This is done by copying a portion of OFDM symbol either at the beginning or at the end. Copying of last few samples is known as Cyclic Prefix Addition.

To reduce the spectral side lobes of the transmitted waveform, transition from one symbol to the other symbol needs to be smooth and at the same time, the transmitted spectral density of the transmitted signal should fall within the defined spectral mask. To achieve this, the Guard Interval inserted OFDM Symbol has to be multiplied with a time domain window. This function is performed in the Wave Shaper block. The Wave-Shaped Transmitted signal is sent to a Radio Transmitter block for up-conversion and amplification before sending it on air.

In known OFDM systems, training symbols are sent at the start of the packet transmission. Therefore, at the start of the packet transmission, the frequency domain-training symbol is converted to time domain by using an IFFT. After Wave shaping it is sent to the radio block for transmission.

Prior art devices are deficient in many respects. These technical deficiencies are with respect to low latency, low gate count, complexity of the components in the system and reduction in the turn around time.

In the prior art systems, in order to support multiple data rate, more than one clock has to be supplied to many blocks in the transmitter. This increases the synchronization logic and increases the complexity of the PLL design.

The current invention addresses the above mentioned issues in respect of low latency in the data transmission, providing multi-rate support, reducing the turnaround time, providing for less complex components in the system and reducing the IFFT latency and the gate count.

It would therefore be desirable to provide systems and methods to address these and other problems

SUMMARY OF THE INVENTION

It is a principal aspect of the present invention to configure a Communication System, the system comprising an improved Orthogonal Frequency Division Multiplexing [OFDM] transmitter devised to provide low latency, low gate count, reduction in the turn around time and multi-rate support during data transmission.

It is an aspect of the present invention to provide for a communication System, the system comprising an Improved VLSI implementation of Orthogonal Frequency Division Multiplexing (OFDM) transmitter, the transmitter configured to provide low latency, low gate count, reduction in the turn around time and multi-rate support during data transmission.

It is also an aspect of the present invention to configure a communication system comprising an improved Orthogonal Frequency Division Multiplexing (OFDM) transmitter, the communication system devised to receive data packets from a Media Access Control, convert the data packets from frequency domain to time domain Orthogonal Frequency Division Multiplexing (OFDM) symbols and send the time domain Orthogonal Frequency Division Multiplexing (OFDM) symbols to the transmitter radio for up conversion to the desired frequency band and transmit the same.

In yet another aspect, the present invention discloses an improved Orthogonal Frequency Division Multiplexing (OFDM) transmitter, the transmitter comprising a Media Access Control interface, a scrambler, a convolutional encoder, a puncturer, an interleaver, a mapper, an Inverse Fast Fourier Transformation (IFFT) device, a guard interval inserter, a wave shaper, a power normalizer, a memory, and a multiplexer. The system has been configured to receive data packets from the Media Access Control, convert the data packets from frequency domain to time domain orthogonal frequency division multiplexing symbols and send the time domain Orthogonal Frequency Division Multiplexing symbol to the transmitter radio for up conversion to the desired frequency band and transmit the same.

In still another aspect, the present invention provides for an improved Orthogonal Frequency Division Multiplexing transmitter, the transmitter comprising a Media Access Control interface configured to synchronise the data bits transmitted by the Media Access Control to the desired system clock, a scrambler configured to scramble the data bits, an encoder configured to encode the data bits received from the scrambler, a puncturer configured to puncture selected data bits to meet the data-rate constraint, an interleaver configured to perform an interleaving operation and generate interleaved data, a mapper configured to map the interleaved data to particular constellation points, an Inverse Fast Fourier Transformation (IFFT) device configured to perform Inverse Fast Fourier Transformation operation enabling converting of the symbol in the frequency domain to time domain symbol, a guard interval inserter configured to send the last few samples first and then transmit all samples generated from Inverse Fast Fourier Transformation (IFFT) device, a Wave Shaper configured to multiply the time domain orthogonal frequency division multiplexing symbol with a time domain window and perform power normalization, a memory configured to store the time domain processed preamble data and a multiplexer configured to select the preamble data first and then the normal data before sending the transmit data on to the radio for up-conversion and amplification, wherein the transmitter is configured to achieve low latency, provide multi-rate support, reduce turnaround time and reduce gate count during data transmission.

It is another aspect of the present invention to provide for an improved OFDM Transmitter, the Transmitter comprising a MAC Interface configured to provide an enable signal to enable the operation of a scrambler, an encoder, a puncturer and an interleaver.

In yet another aspect, the present invention provides for an OFDM transmitter configured to provide a shift register based interleaver. The interleaver is configured to provide data in the order required by an IFFT device thereby avoiding an input memory to arrange the data before sending it to the input of the IFFT device.

The present invention further provides a method of transmitting data employing a communication system, the method comprises receiving data packets from a Media Access Control, converting the data packets from frequency domain to time domain as time domain Orthogonal Frequency Division Multiplexing symbols and sending the time domain Orthogonal Frequency Division Multiplexing symbols to a radio for up conversion to the desired frequency band and transmitting the same.

In still another aspect, the present invention provides for a method of transmitting data employing an Improved OFDM Transmitter. The method comprises receiving data packets from a Media Access Control, converting the data packets from Frequency Domain to Time Domain as Time Domain Orthogonal Frequency Division Multiplexing Symbols and sending the Time Domain Orthogonal Frequency Division Multiplexing Symbols to a radio for up conversion to the desired frequency band and transmitting the same.

According to yet still another aspect, the present invention provides for a method of transmitting data employing a Communications System comprising an improved Orthogonal Frequency Division Multiplexing transmitter. The method comprises synchronising a Media Access Control transmitted data bits to a desired system clock employing a Media Access Control interface, scrambling data bits employing a scrambler, encoding the data bits received from the scrambler using an encoder, puncturing selected data bits to meet the data-rate constraint employing a puncturer, performing data interleaving by an interleaver to generate interleaved data, mapping the interleaved data by a mapper configured to map data to a constellation point, performing Inverse Fast Fourier Transformation by an IFFT device, converting the frequency domain symbol to time domain symbol, sending a set of selected last samples first followed by transmitting all samples generated from the IFFT device by a guard interval inserter, multiplying the time domain orthogonal frequency division multiplexing symbol with a time domain window, performing power normalization by a wave shaper, storing the time domain processed preamble data by a memory; selecting the preamble data first and then the normal data before sending the transmit data on to the transmitter radio for up-conversion and amplification by a multiplexer, wherein the method of transmitting data employing the improved Orthogonal Frequency Division Multiplexing (OFDM) transmitter enables the communications system to achieve low latency, to provide multi-rate support, reduction in the turnaround time and reduction in the gate count during data transmission.

It is yet another aspect of the present invention to configure an improved Orthogonal Frequency Division Multiplexing transmitter comprising a parallel scrambler devised to scramble synchronized data bits.

It is still a further aspect of the present invention to configure an improved Orthogonal Frequency Division Multiplexing transmitter comprising a parallel convolutional encoder devised to encode data received from a parallel scrambler.

BRIEF DESCRIPTION OF THE DRAWING FIGURES

Further objects of the present invention together with additional features contributing thereto and advantages accruing therefrom will be apparent from the following description of a preferred embodiment of the invention which is shown in the accompanying drawing with like reference numerals indicating like components throughout, wherein.

DETAILED DESCRIPTION OF THE INVENTION

Figure 1:
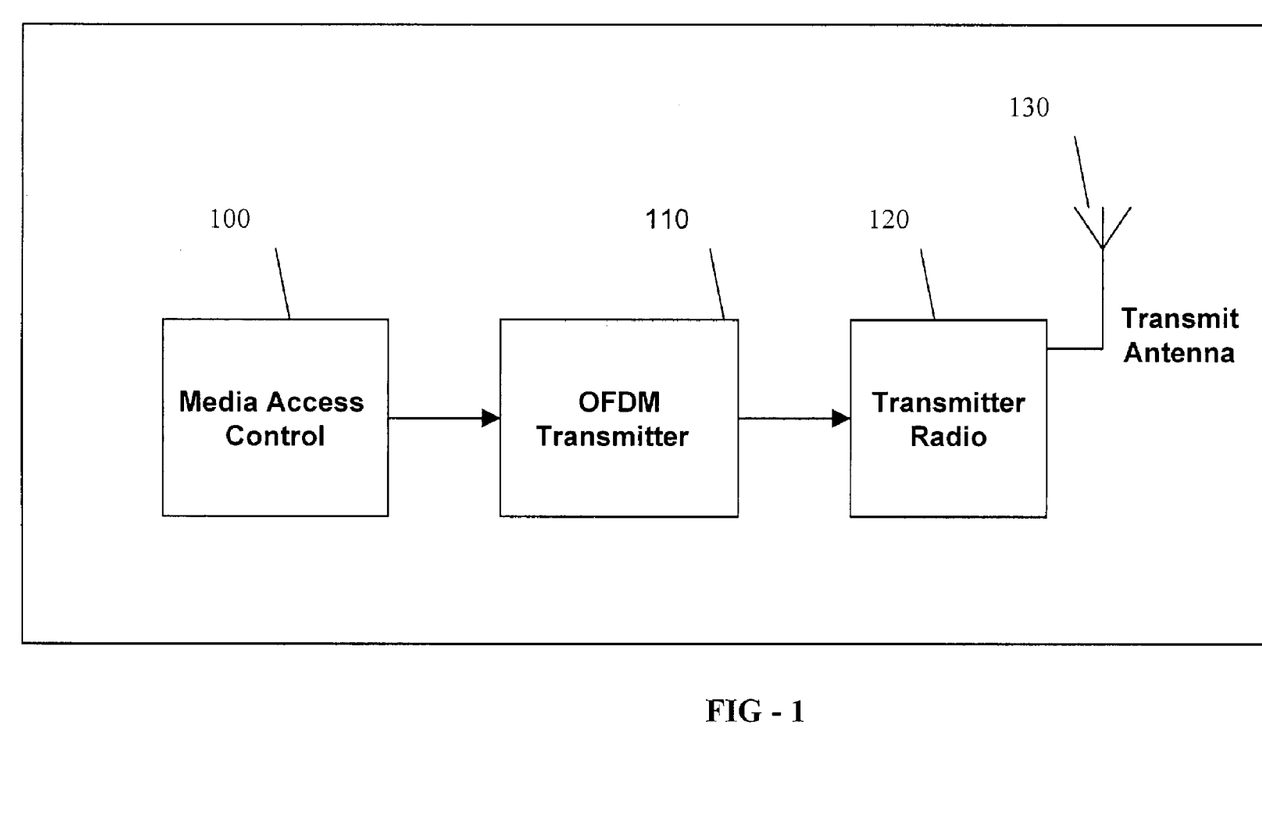
FIG. 1 is a block diagram illustrating an improved OFDM transmitter in a wireless communication system.

FIG. 1 illustrates in general the wireless transmission system. A Media Access Control (MAC) 100 forms packets and controls the transmission of data through an Orthogonal Frequency Division Multiplexing (OFDM) transmitter 110 and transmitter radio 120. OFDM transmitter 110 processes the data received from MAC 100 and converts it into time domain OFDM symbols. The time domain OFDM symbol is up-converted to the desired frequency band by transmitter radio 120. The transmitter radio 120 also amplifies the data to be sent on air. The amplified and up-converted transmit data is sent on air by a transmit antenna 130.

Figure 2:
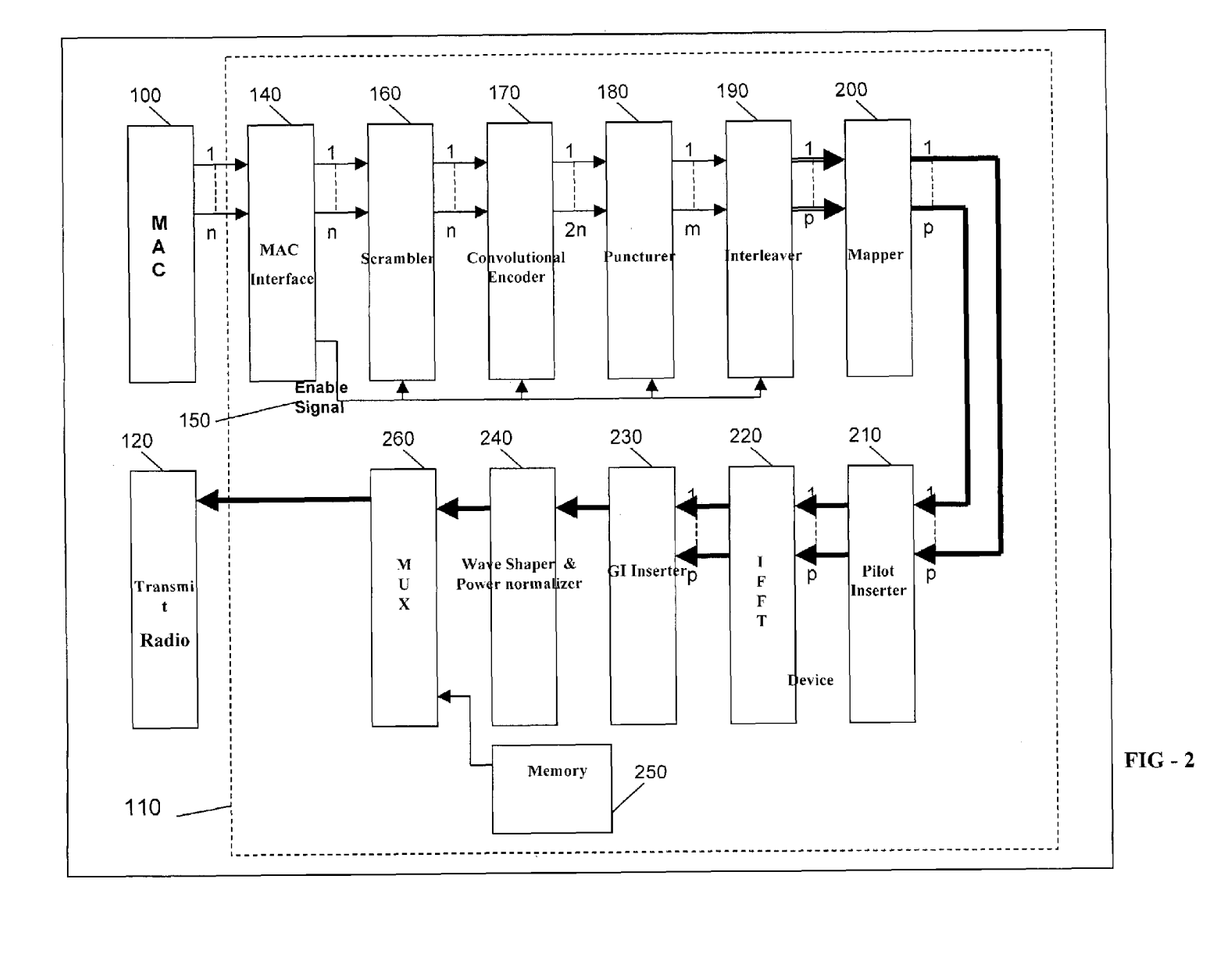
FIG. 2 is a block diagram illustrating the components of an improved OFDM transmitter.

FIG. 2 describes the components of an OFDM transmitter 110 in detail. A MAC 100 sends data to OFDM transmitter 110 to transmit data on air. MAC interface 140 is an n-bit parallel interface. MAC 100 sends n-bits at a time for transmission. MAC interface 140 in the OFDM transmitter 110 synchronizes the MAC transmitted data bits to the desired system clock of the OFDM transmitter.

To support multiple data rates transmission, MAC interface 140 generates an enable signal 150 to control the operation of scrambling, encoding, puncturing and interleaving. A single clock is used for all the blocks of the transmitter for processing. By varying the width of the enable signal 150, different data rates can be achieved. For a 4-bit parallel interface, the enable signal will be high for 54 clocks for 54 Mbps and 6 clocks for 6 Mbps per OFDM symbol. Since only one clock is used, the PLL design for generating the clock is simplified.

The synchronized data bits are scrambled by using a parallel scrambler 160. Scrambler 160 takes only one clock to scramble n bits of data. Where 'n' is an integer chosen in such a way that the number of data bits in an OFDM symbol for all supported data rates is divisible by n. A parallel convolutional encoder 170 is used to encode data bits coming from scrambler 160. Convolutional Encoder 170 generates 2n bits of data every clock for every n bits of scrambled data. The encoded data bits are passed through a puncturer 180 where it punctures some of the data bits to meet the data-rate constraint. The puncturing rate depends on the OFDM system and data rate. 'm' number of bits are transferred from puncturer 180 to interleaver 190 every clock when puncturer 180 is enabled.

A group of bits of interleaved data is mapped to a particular constellation point by using mapper 200. The number of bits grouped together to map to a particular constellation point depends on the modulation type. For BPSK it is one bit, for QPSK 2 bits, for 16-QAM 4 bits and for 64-QAM 6 bits group is needed.

Interleaver 190 gives 'p' groups of output at a time. The value of 'p' can be 2, 4, 8 . . . power of 2. The value of 'p' depends on radix type used for IFFT operation. For example, it is 2 for Radix-2 IFFT and 4 for Radix-4 IFFT. The mapper 200 converts those 'p' groups of interleaved data to corresponding number of constellation points.

Pilot inserter 210 multiplexes data, pilot, or null depending on the sample position in the OFDM symbol. Frequency domain OFDM symbol is converted to a time domain OFDM symbol by an IFFT device 220.

The IFFT device 220 does not require input memory to rearrange the data in digit reverse order because interleaver 190 arranges and generates data as required by IFFT device 220. This decreases the latency in the IFFT device 220.

After the OFDM symbol is converted to time domain symbol, cyclic prefix is added to reduce Inter Symbol Interference (ISI) effect. The Guard Interval (GI) Inserter 230 sends the last few samples first and then transmits all samples generated from IFFT device 220.

In order to reduce the spectral side lobes of the transmitted data, the transition from one OFDM symbol to other symbol needs to be smooth and the spectral density of the transmitted signal should fall within the spectral mask. To achieve this, the wave shaper and power normalizer 240 multiply a desired time domain window with the time domain OFDM symbol. This block performs the power normalization by using the same multiplier. By deferring the power normalization from frequency domain to time domain and combining it with the wave shaping, one set of multiplier blocks are saved. In a VLSI implementation, this reduces the number of gates.

In OFDM transmitters, training symbols are sent to train the receiver so that receiver can receive the normal data properly. The time domain processed preamble (training) data is stored and can be sent directly without any further processing as soon as MAC signals the OFDM transmitter to start transmission. This reduces the transmit chain latency. So the receive-transmit turnaround time is significantly reduced. In wireless systems, after receiving a packet, the acknowledgement packet needs to be sent within a certain amount of time. Due to the improvement in receive-transmit turnaround time in this implementation, this allows sufficient time for other blocks such as MAC 100 and transmitter radio 120 to process the received data and send the acknowledgement.

Figure 3:
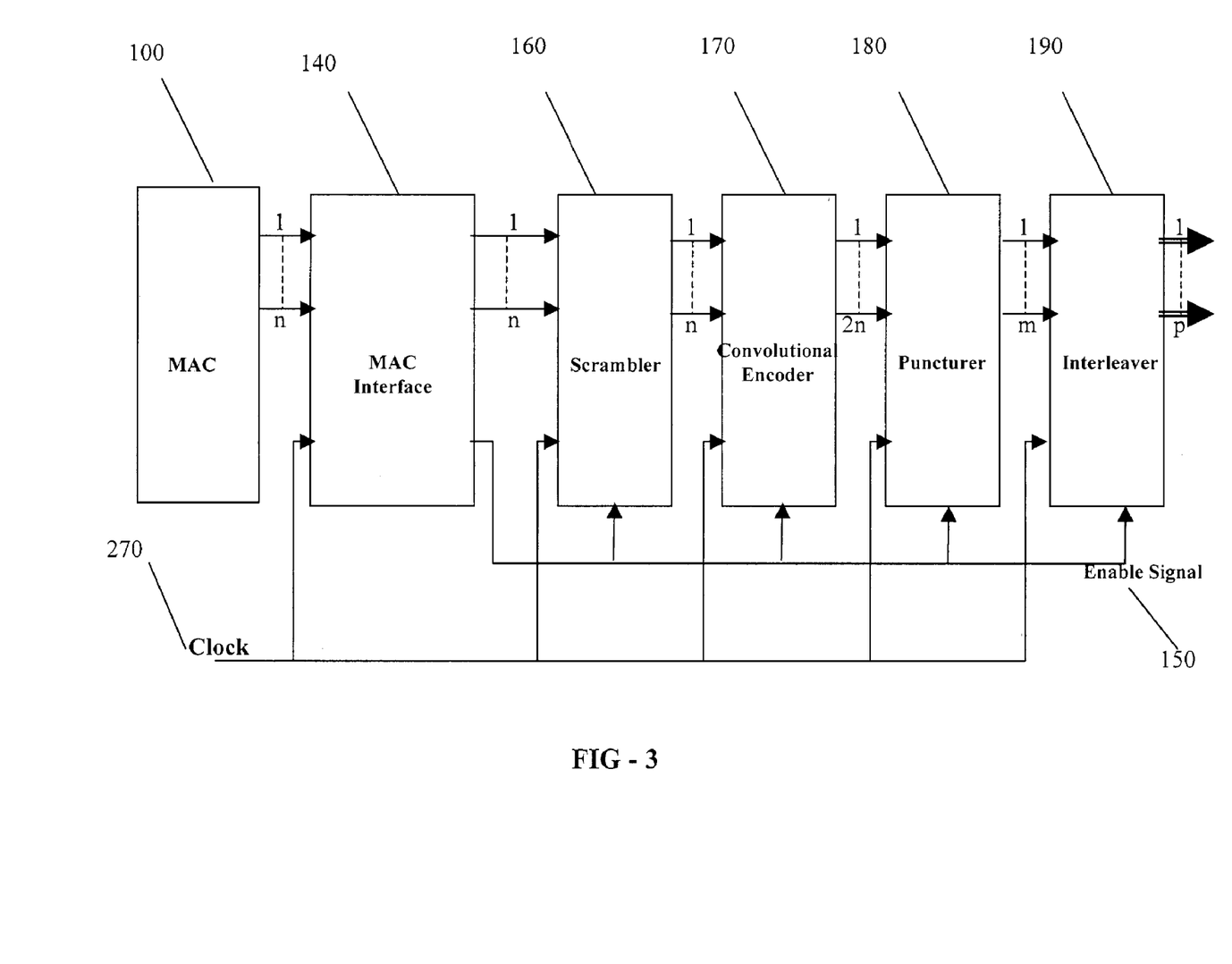
FIG. 3 illustrates a multi-rates scheme implementation in an improved OFDM transmitter.

FIG. 3 illustrates the implementation of multi-rate support using single clock in detail. MAC 100 gives multiple bits (n bits) every clock. MAC-interface 140 is a parallel interface. MAC interface 140 synchronizes n bits of data coming from MAC 100 to the desired system clock and gives the data bits to scrambler 160 for scrambling. A parallel scrambler 160 scrambles n bits in one clock. Convolutional encoder 170 generates 2n number of convolutionally encoded bits in one clock. Puncturer 180 deletes some particular predefined bits to generate m number of bits. Punctured data bits are accumulated in Interleaver 190. Here 'n' is an integer chosen in such a way that the number of data bits in an OFDM symbol for all supported data rates is divisible by n. Value of 'm' depends on value of 'n' and the puncturing rate.

To support multiple data rate, only one clock 270 is used. MAC interface 140 generates an enable signal 150, which enables the operation of scrambler 160, convolutional encoder 170, Puncturer 180 and Interleaver 190. Enable signal 150 enables the scrambler 160, convolutional encoder 170, puncturer 180 and interleaver 190. Enable signal 150 is periodic in time and repeated every OFDM symbol. Duty cycle of enable signal 150 is varied depending on the data rate. Only a single clock is provided to all the blocks. This results in a simple PLL design. Parallel scrambler 160 and parallel convolutional encoder 170 decrease the latency by a significant amount. While a serial scrambler takes n clocks for scrambling n data bits, parallel scrambler 160 takes only one clock for scrambling operation. So there is a saving of n−1 clocks.

Figure 4:
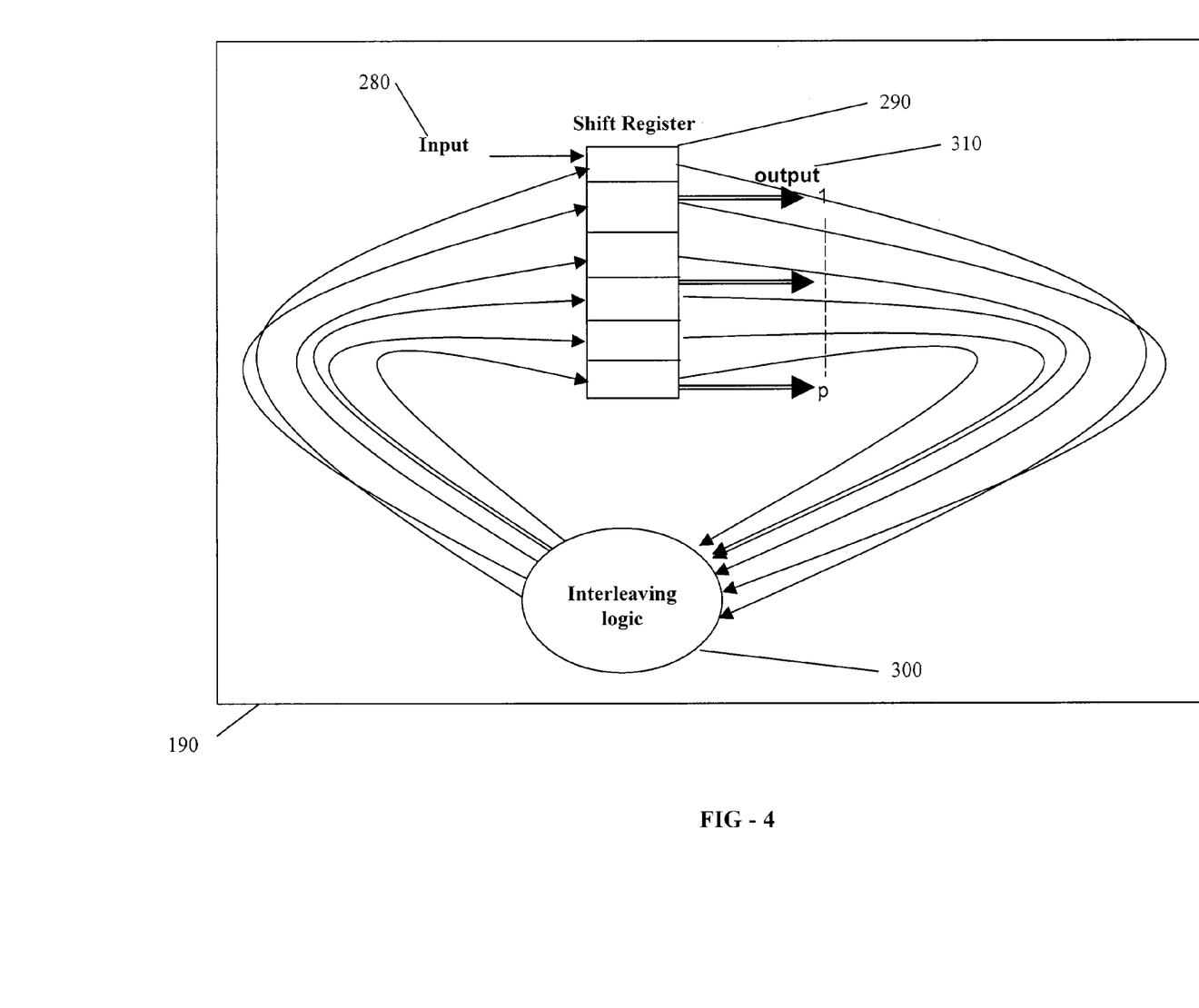
FIG. 4 and FIG. 5 illustrate a block diagram describing interleaver implementation.

Referring to FIG. 4, the interleaver 190 implementation has been illustrated. The interleaver 190 has a shift register 290 and an interleaving logic 300. Punctured bits (Interleaver 190 input 280) are accumulated in a shift register 290. The shift register 290 accumulates data bits for a complete OFDM symbol. After accumulation, the interleaving logic 300 shuffles the data in a predetermined order in a single clock and store the data bits in the same shift register 290. After shuffling the data, it is read out serially from the required number of points. Number of outputs is determined by radix used in IFFT operation. For Radix-2 IFFT interleaver gives 2 outputs, for Radix-4 it gives 4 outputs at a time.

Figure 5:
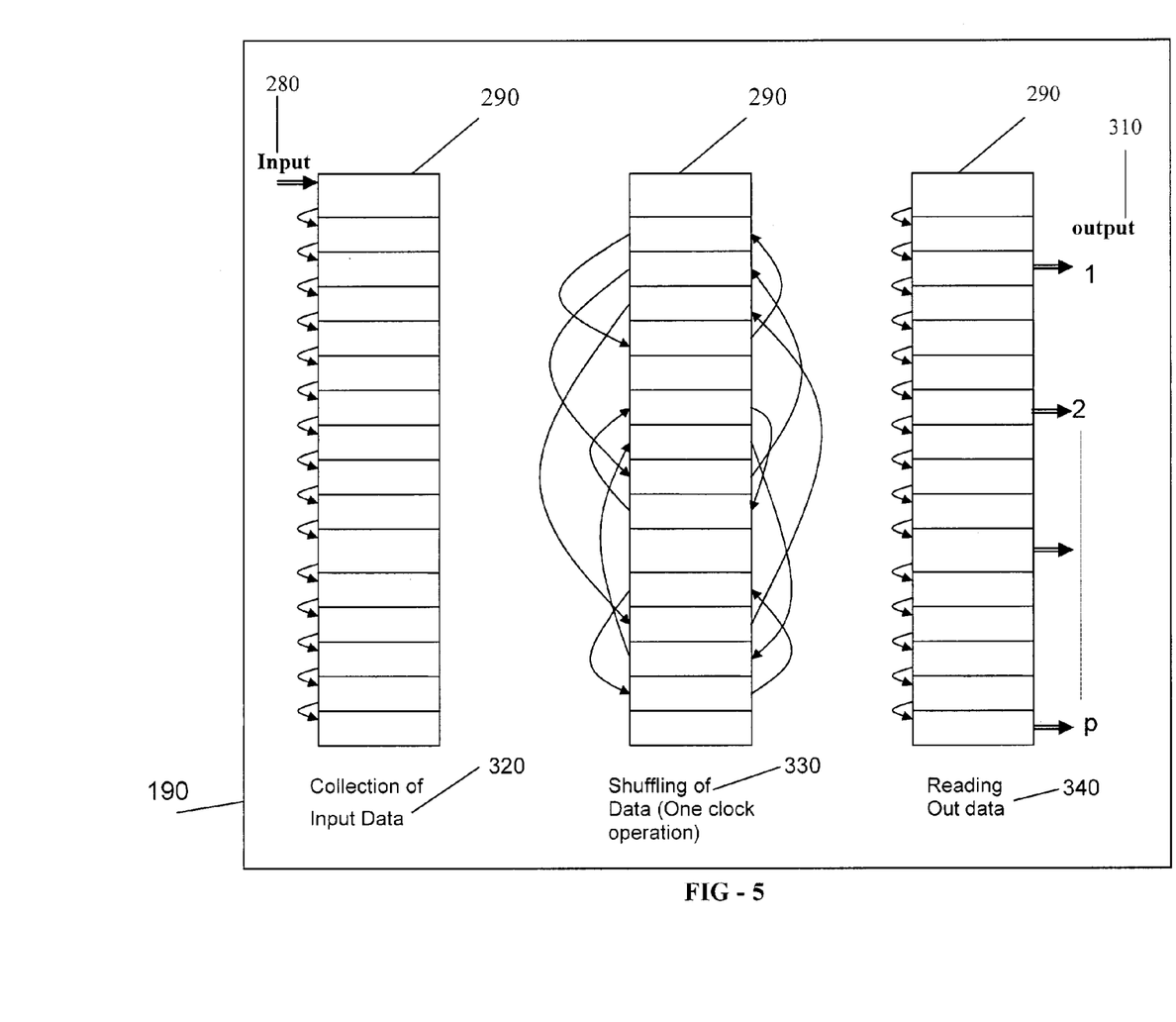

FIG. 5 illustrates the three stages of the interleaving operation. First stage is collecting punctured bits in a shift register 290. Every clock, the data bits of an OFDM symbol are shifted down so that the input 280 punctured bits can be written into the shift register 290 at the top. So there is no need of a write address unlike in memory based design. Second stage is shuffling of the data bits. Bits are shuffled in a pre-defined pattern. Shuffling operation requires only one clock. After shuffling, the next stage is to read out interleaved data bits from the shift register 290. Multiple shuffled bits are the output 310 and can be read out from the shift register 290 at a time. The shuffled data bits need to be grouped together to map to a particular constellation point.

The number of bits in the group depends on the modulation type. The number of such groups read out from the shift register 290 depends on the IFFT implementation. For Radix-2, two groups need to be read out at a time. For Radix-4, four groups need to be read out at a time. In the interleaving operation itself data bits are arranged in such a way that the IFFT device 220 gets the data in proper order.

A group of data bits is read out from the particular locations in the shift register 290. Since the data bits are shifted every clock, the next group of data bits can be read from the same locations in the next clock. This eliminates the address generation logic.

Figure 6:
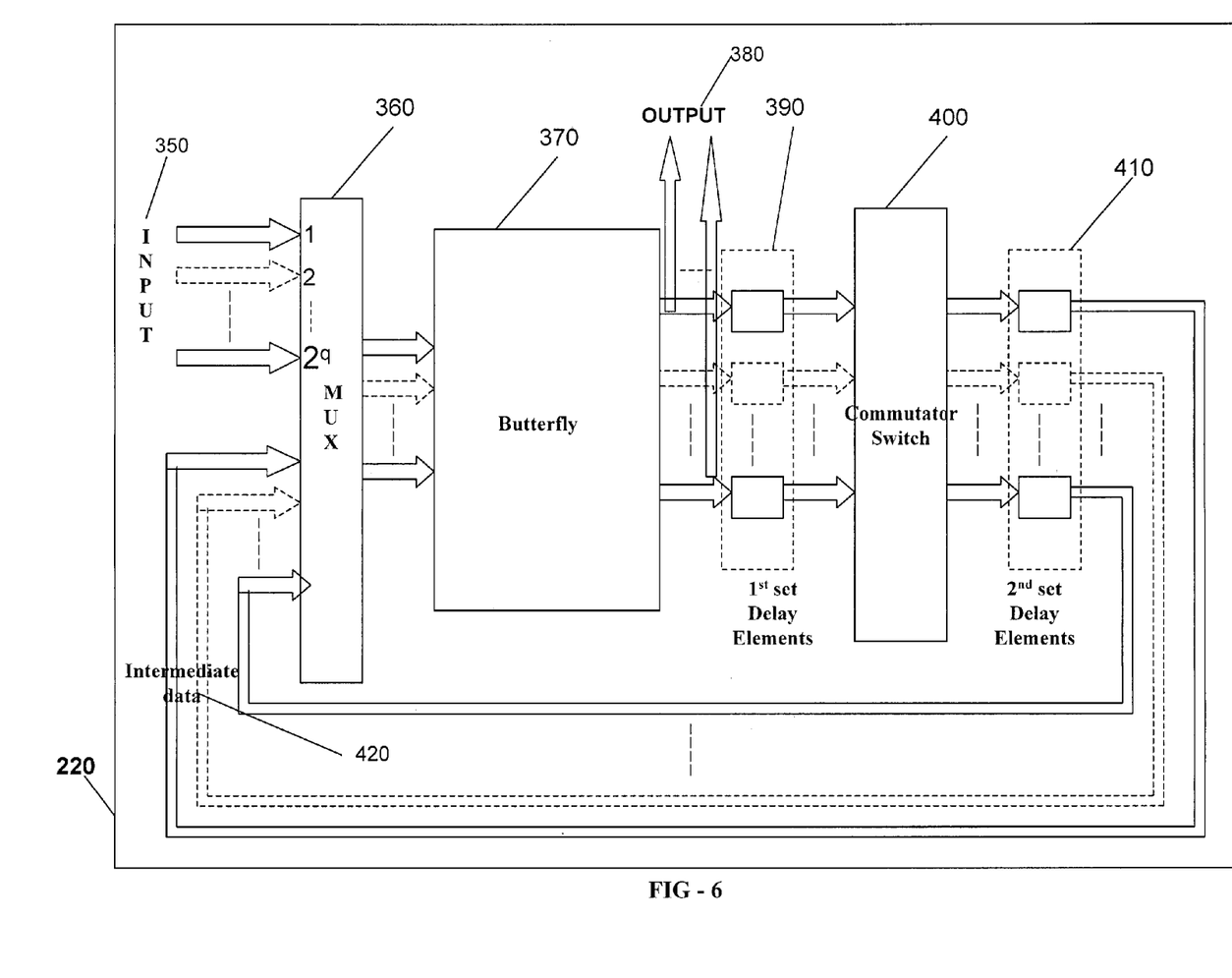
FIG. 6 and FIG. 7 illustrate the implementation of the IFFT device.
Figure 7:
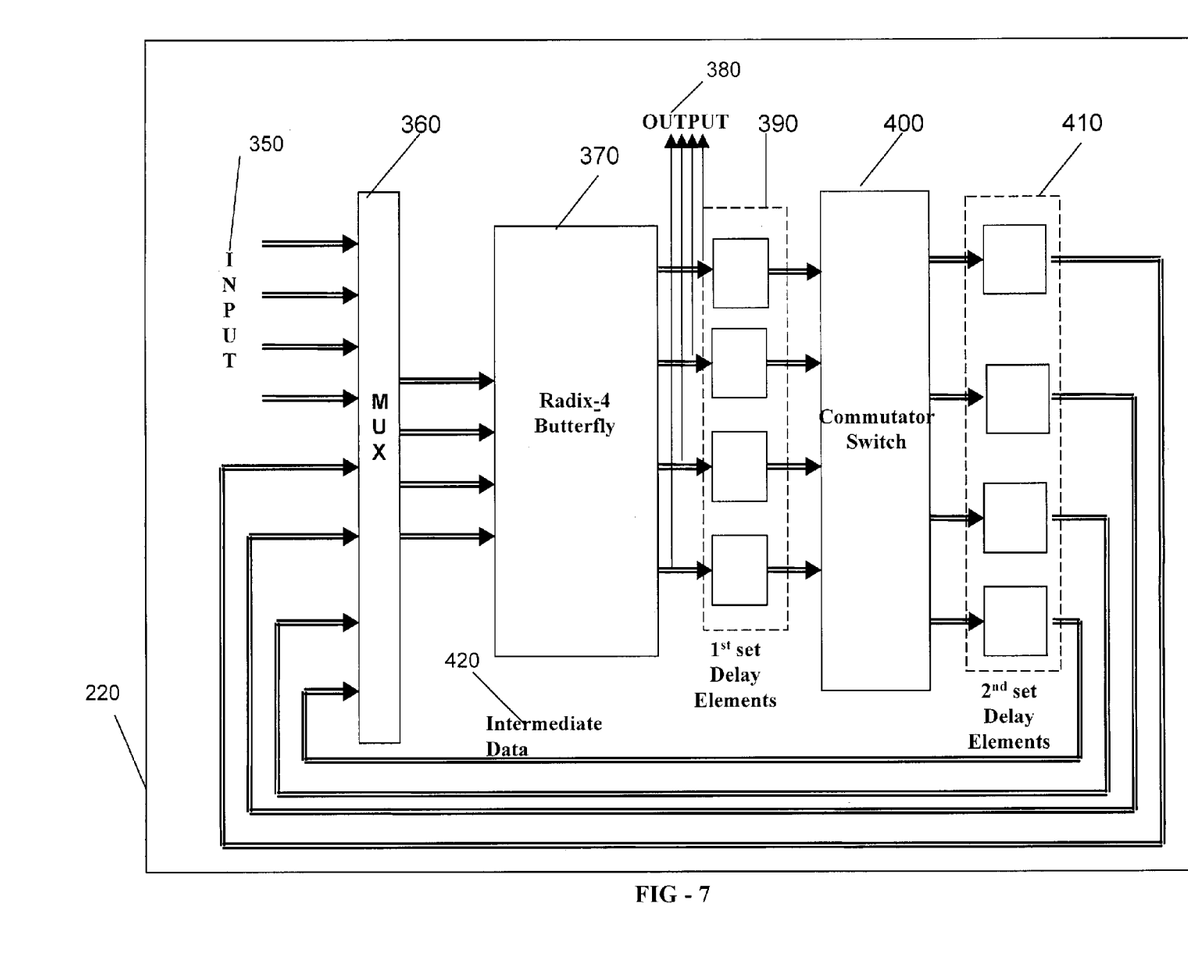

FIGS. 6 and 7 disclose the operation in an IFFT Device 220. Typical IFFT implementation consists of butterfly processing elements and memories. The data at the input of IFFT has to be in the digit reversed order. There are multiple stages of processing in an IFFT operation. The number of stages in the IFFT operation depends on the Radix type used and the number of points. Separate butterflies are used in tandem in different stages of IFFT operation to reduce the latency. The intermediate values from the previous stage butterfly are stored in memory and rearranged to input into the next stage of IFFT operation. Latency incurred in the accumulation and rearrangement operation at the input of IFFT block is very high in conventional designs. Gate-count is also high due to usage of separate butterflies at each stage of operation.

With reference now specifically to FIG. 6, there is disclosed the implementation of an IFFT device 220 according to the present invention. The interleaver 190 gives data in parallel and in the interleaving operation itself data bits are arranged as required at the IFFT input. Therefore, there is no need for an input memory to store the interleaved data. This reduces the latency as well as gatecount (due to elimination of accumulation logic and input memory). Same butterfly 370 and delay elements 390 and 410 are used for all the stages of IFFT operation. This reduces the gatecount significantly compared to the conventional design. Multiplexer 360 selects between the data coming as input 350 to IFFT and the output of second set of delay elements 410. For first stage operation, multiplexer selects input data of IFFT device 220 as data for butterfly processing. For subsequent stages of processing, it selects the intermediate data originating from second set delay elements 410. Number of inputs 350 to the butterfly 370 depends on radix. For example, the number of inputs to the butterfly is two for Radix-2, four for Radix-4, eight for Radix-8 . . . . For radix-2 'q' is 1, for radix-4 'q' is 2 and for radix-8 'q' is 3. Number of stages to do the IFFT operation depends on total number of inputs and radix. For example, for a 64 point IFFT, Radix-2 needs 6 stages to complete, Radix-4 needs 3 stages and Radix-8 needs only 2 stages. At the end of the last stage, the butterfly output is taken as the IFFT device 220 output.

For intermediate stages, butterfly outputs are passed through a first set of delay elements 390. Same set of delay elements is used for all the stages. Commutator switch 400 rearranges the data in such a way that after the current stage, data gets ready in a proper order for next stage operation. The rearranged data is passed through a second set of delay elements 410. This second set delay elements 410 is also reused for all the stages to reduce gate count. The delay element has variable delay depending on stage and radix. After the second set delay elements 410, data is given to butterfly 370 through multiplexer 360 for next stage processing. In the preferred embodiments, Interleaver gives data in digit reversed order. So there is no need of accumulation logic. This decreases the latency by a considerable amount. Same butterfly and delay elements are used for all stages of processing. There is no requirement of an input memory for rearranging the data. This results in a low gate count design. FIG. 7 describes the IFFT implementation for Radix-4.

Figure 8:
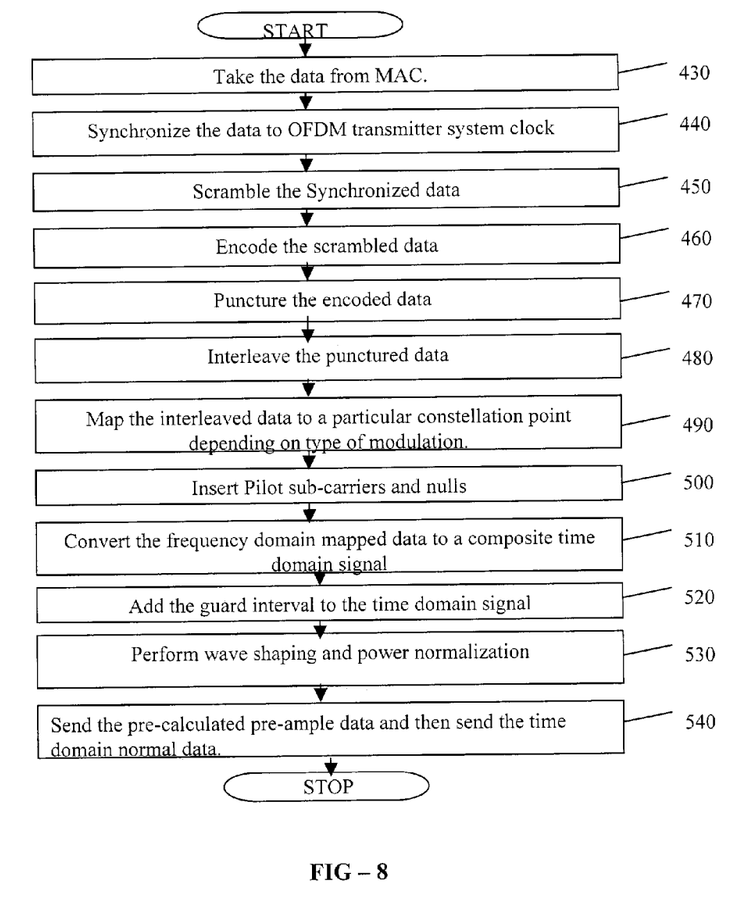
FIG. 8 illustrates the method of operation of the improved OFDM transmitter.

Referring to FIG. 8, the method of operation of the Improved OFDM transmitter implemented system has been illustrated. The flow of data from MAC 100 to transmitter radio 120 through OFDM transmitter 110 is illustrated. The packet to be transmitted comes from MAC 100 as shown in step 430. In the MAC interface 140, the data coming from MAC 100 is synchronized to the OFDM system clock 440. Synchronized data is scrambled by a parallel scrambler 160 shown in step 450. Scrambled data is encoded by parallel convolutional encoder 460 to make the data forward error correction enabled. To achieve the particular data rate some of the bits have to be deleted. A puncturer is therefore used for this purpose, step 470. Punctured data bits are shuffled to reduce burst error 480. This shuffling is done by an interleaver 190. Mapper 200 maps the data bits to a particular constellation point depending on modulation type used. The same is shown in step 490. Pilot sub-carriers and nulls are inserted at predefined points in the mapped OFDM symbol depicted by step 500. IFFT device 220 converts the OFDM frequency domain symbol to time domain OFDM symbol, shown by step 510. After converting the data to time domain, guard interval is added to the OFDM symbol by a guard interval inserter, represented by step 520 to reduce inter symbol interference (ISI). The time domain OFDM symbol is shaped and power normalized before sending to the transmitter radio 120, shown by step 530. At the beginning of the packet transmission, pre-calculated time domain preamble is sent which are stored in the memory 250 shown by step 540. The shaped and normalized data is sent after the preamble transmission until entire packet transmission is over shown in step 540.

Figure 9:
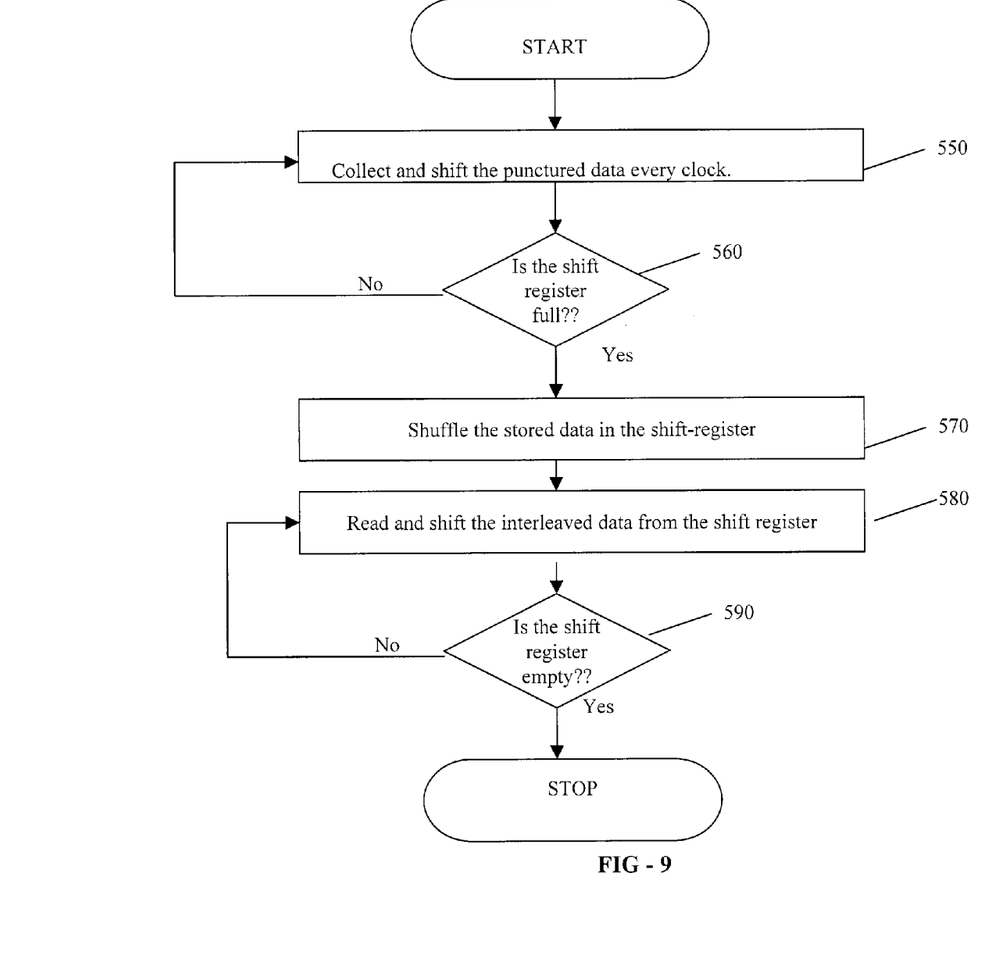
FIG. 9 illustrates the flow of data in the interleaver.

FIG. 9 illustrates the process flow in the method of interleaving operations in 3 stages. In the first stage, the punctured data bits are stored and shifted shown in step 550 in a shift register 290 till the shift register 290 is full, in step 560. After accumulation of data bits, the data bits are shuffled in a predefined order shown in step 570. In the third stage, interleaved data bits are readout and shifted shown in step 580 from particular locations in shift register 290 till the shift register becomes empty shown in step 590.

Figure 10:
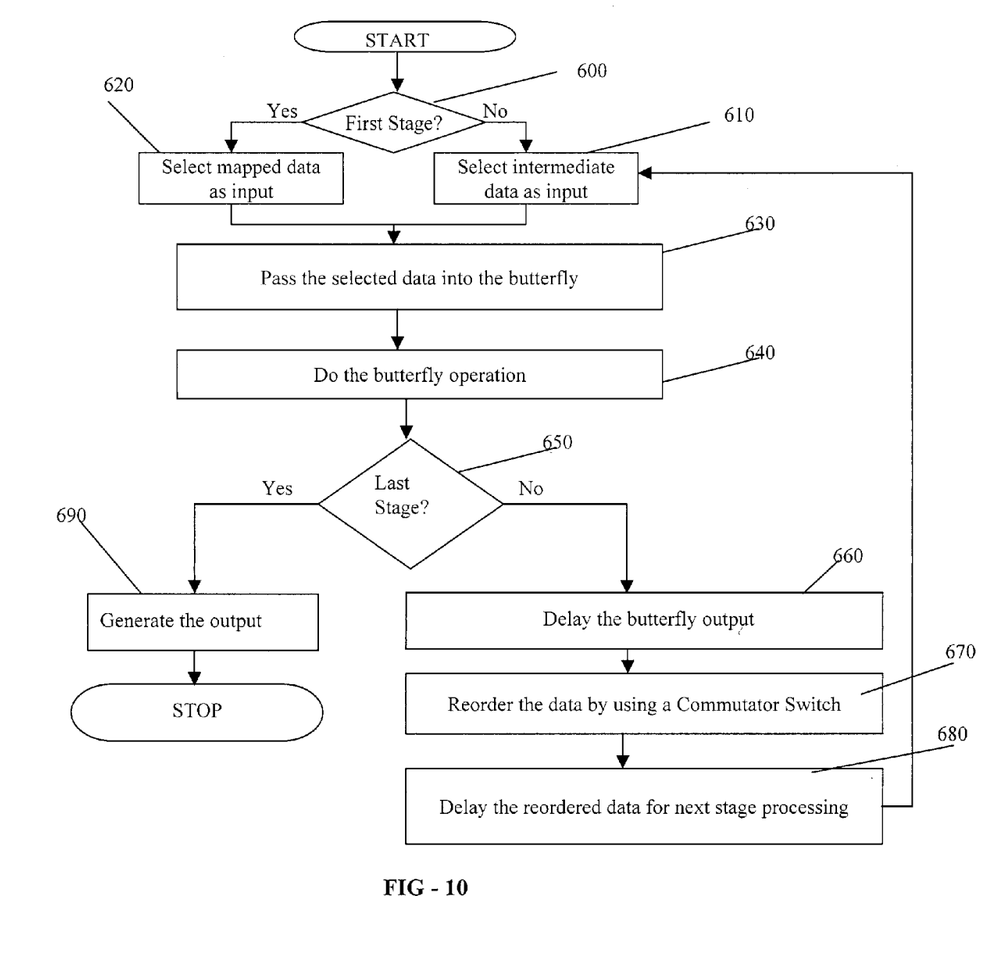
FIG. 10 illustrates the method of operation of the IFFT device.

FIG. 10 shows the process flow in depicting the method of IFFT operation. The multiplexer 360 selects the data coming to the IFFT device 220 as input shown by step 620 or the data coming from the second set delay elements 610. For the first stage operation 600, the multiplexer selects data coming to IFFT device 220 as input 620 and for subsequent stages of operation it selects data from the second set delay elements 610. After selecting the data, butterfly device 370 processes the data 640. If the number of stages required for IFFT device 220 processing is completed, step 650, then the butterfly 370 output is taken as final IFFT device 220 output, 690. If the number of stages of computation is not yet over or complete 650, then the butterfly 370 output is passed through first set delay elements, 660. After the first set delay, the commutator switch 400 reorders the data in a proper order, 670 as required by butterfly for next stage processing. The commutator switch outputs are passed through another set of delay elements 680. After delaying, the data is passed to the butterfly 370 for next stage operation, 630.

The improved OFDM Transmitter 110 implemented communication system enables use of a single clock for all the blocks in the transmitter along with the enable signal 150 generated by MAC interface 140, which enables scrambler 160, convolutional encoder 170, puncturer 180, and interleaver 190 blocks for a particular amount of time. In a VLSI implementation, lesser number of clocks reduces the complexity of PLL design. Parallel scrambler 160 and parallel convolutional encoder 170 are used, thus reducing the latency by a significant amount. A parallel scrambler 160 scrambles n bits of data in one single clock. But serial scrambler takes n clocks for that operation. So in parallel scrambler there is a saving of n−1 clocks. Interleaver 190 is designed using shift register 290. Therefore, at any point of time more than one bit can be readout to form the group and multiple groups of outputs can be generated in a single clock. This decreases the latency in the interleaver circuit. Interleaver is shift register based. The groups of data can be read from particular positions in the shift register 290 at any given time. Since the data shifted every clock, the next group of data is available at the same position in the shift register 290. So there is no need to generate the address bus for reading the data unlike in the conventional memory based design. Interleaver is designed in such a way that it gives data in the order required by IFFT device. So there is no need of input memory to arrange data before giving it to the input of IFFT device. This decreases the latency as well as gate-count. In the IFFT implementation, same butterfly and delay elements are used for all stages of processing which further reduces the gate count. Time domain preamble data samples are stored in memory. Whenever there is a need to transmit, it can directly start transmission by sending those preamble time domain data samples before transmitting normal data. This decreases the receive-transmit turnaround time. Power normalization is done in time domain instead of frequency domain. Moreover, power normalization is combined with wave shaping. Both these operations are done by using a single set of multipliers. This again results in gate count reduction.

While this invention has been described in detail with reference to certain preferred embodiments, it should be appreciated that the present invention is not limited to those precise embodiments. Rather, in view of the present disclosure, which describes the current best mode for practicing the invention, many modifications and variations would present themselves to those skilled in the art without departing from the scope and spirit of this invention.

We claim:

1. An improved Orthogonal Frequency Division Multiplexing (OFDM) transmitter comprising:
    a Media Access Control interface configured to synchronise data transmitted by a Media Access Control to the desired system clock;
    a parallel scrambler configured to scramble the synchronized data bits; and
    a parallel convolutional encoder configured to encode the data bits received from the parallel scrambler so that data transmitted by the transmitter is convolutionally encoded.

2. The transmitter according to claim 1 further including a puncturer configured to puncture selected data bits to meet the data-rate constraint.

3. The transmitter according to claim 1 further including an interleaver configured to perform an interleaving operation and generate interleaved data.

4. The transmitter according to claim 1 further including a mapper configured to map the interleaved data to a particular constellation point.

5. The transmitter according to claim 1 further including an Inverse Fast Fourier Transformation (IFFT) device configured to perform Inverse Fast Fourier Transformation operation enabling converting of the symbol in the frequency domain to time domain symbol.

6. The transmitter according to claim 5 further including a guard interval inserter configured to send selected last samples first and then transmit all samples generated by said Inverse Fast Fourier Transformation device.

7. The transmitter according to claim 5 further including a wave shaper and power normalizer configured to multiply the time domain orthogonal frequency division multiplexing symbol with a time domain window and perform power normalization.

8. The transmitter according to claim 1 further including a memory configured to store a time domain processed preamble data.

9. The transmitter according to claim 8 further including a multiplexer configured to select the preamble data first and then the normal data before sending the transmit data on to the radio for up-conversion and amplification, the transmitter being configurable to provide low latency, low gate count, reduction in the turn around time, and multi-rate support during data transmission.

10. The transmitter according to claim 1 wherein the transmitter is configured to provide for an enable signal to support multiple data rates transmission using a single clock and to control the operation of the components thereof.

11. The transmitter according to claim 3 wherein the transmitter is configured to provide for a shift register based interleaver.

12. The transmitter according to claim 11 wherein the interleaver is configured to provide data in the order required by the IFFT device thereby eliminating any input memory to arrange the data before giving it to the input of the IFFT device.

13. The transmitter according to claim 7 wherein said wave shaper and power normalizer is configured to perform power normalization in time domain combined with wave shaping.

14. The transmitter according to claim 5 wherein said IFFT device is configured to use a single butterfly element, a multiplexer, a commutator switch and a plurality of delay elements to complete the IFFT operation.

15. The transmitter according to claim 8 further including a memory configured to store the pre-calculated time domain preamble data.

16. A wireless communications system including the OFDM transmitter recited in claim 1.

17. A method of transmitting data employing an improved Orthogonal Frequency Division Multiplexing transmitter, said method comprising:
    synchronising a Media Access Control transmitted data bits to a desired system clock employing a Media Access Control interface;
    scrambling data bits employing a parallel scrambler; and
    encoding the data bits received from the parallel scrambler using a parallel encoder so that the data transmitted by the transmitter is directed to the radio for up-conversion and amplification by a multiplexer.

18. The method according to claim 17 further including puncturing selected data bits to meet the data-rate constraint employing a puncturer.

19. The method according to claim 17 further including interleaving the data by an interleaver to generate interleaved data.

20. The method according to claim 17 further including mapping the interleaved data by a mapper configured to map data to a particular constellation point.

21. The method according to claim 17 further including performing an Inverse Fast Fourier Transformation by an IFFT device configured to perform the Inverse Fast Fourier Transformation operation enabling converting the symbol in the frequency domain to time domain symbol.

22. The method according to claim 17 further including sending the selected last samples first and then transmit all samples generated from the Inverse Fast Fourier Transformation device by a guard interval inserter.

23. The method according to claim 17 further including multiplying the time domain Orthogonal Frequency Division Multiplexing symbol with a time domain window and performing power normalization by a wave shaper.

24. The method according to claim 17 further including storing the time domain processed preamble data by a memory.

25. The method according to claim 17 further including selecting the preamble data first and then the normal data before sending the transmit data on to the radio for up-conversion and amplification by a multiplexer.

26. The method according to claim 17 wherein performing the steps thereof enables the communications system to achieve a low latency.

27. The method according to claim 17 wherein performing the steps thereof enables the communications system to provide a multi-rate support, a reduction in the turnaround time, and a reduction in the gate count during data transmission.

28. A wireless communications system implementing the data transmitting methods recited in claim 17.

29. A wireless communications system utilized to practice the data transmitting methods recited in claim 17.

* * * * *